Sept. 15, 1964     A. A. ANSPACH     3,148,423
QUICK DETACHABLE CONNECTOR FOR LIGHT FISHING TACKLE
Original Filed Nov. 13, 1957
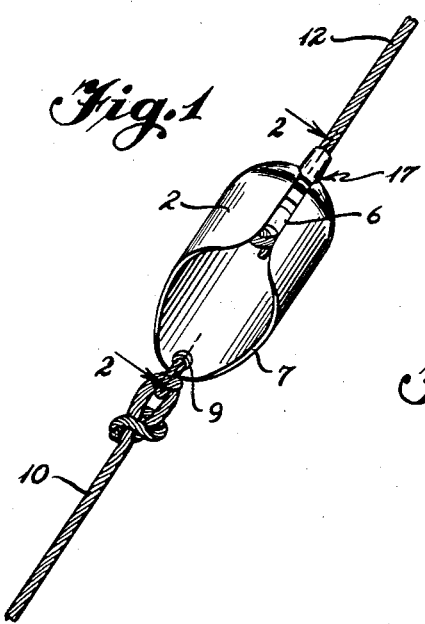
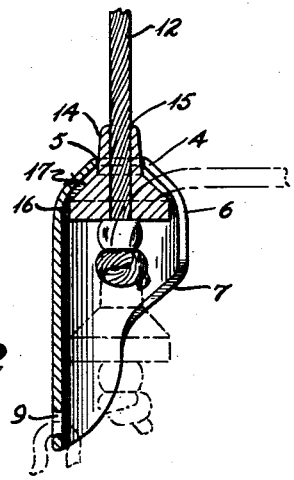
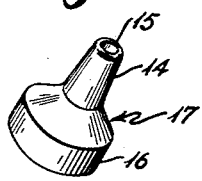
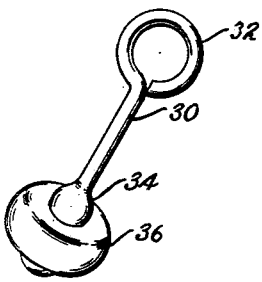
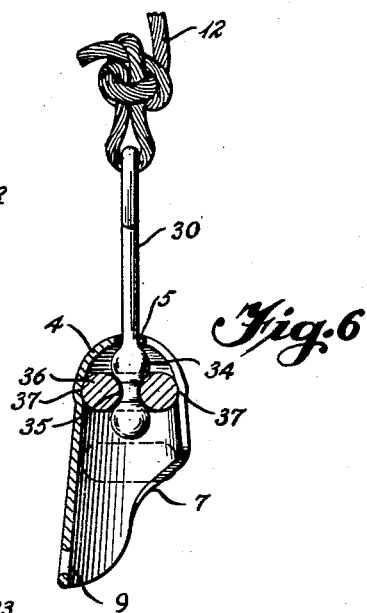
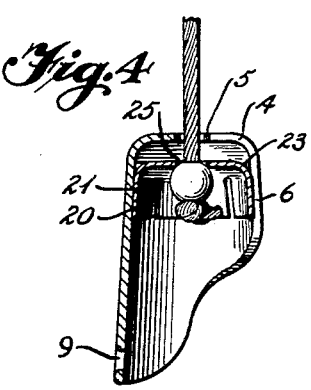
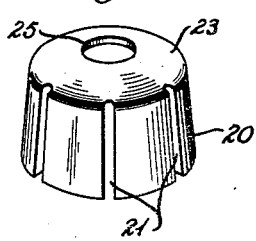
INVENTOR
*Archie A. Anspach*
BY *Robert U. Geil, Jr.*
ATTORNEY

United States Patent Office 3,148,423
Patented Sept. 15, 1964

3,148,423
QUICK DETACHABLE CONNECTOR FOR
LIGHT FISHING TACKLE
Archie A. Anspach, 359 Gundry Drive,
Falls Church, Va.
Continuation of application Ser. No. 696,172, Nov. 13, 1957. This application Dec. 6, 1961, Ser. No. 160,393
3 Claims. (Cl. 24—123)

The present invention relates to the general art of fishing equipment, and more particularly, to a means for attaching and detaching a fishing leader to the end of a fishing line. Such leaders are, of course, provided adjacent their outer ends with bait, hooks, lines, etc.

It is among the objects of the present invention to provide a device of the class described which functions easily and quickly, even under unfavorable conditions, such as places where visibility is poor, etc., being capable of operation principally through the feeling of the component elements by the fisherman.

Another object is the attainment of the foregoing ends with a device which is durable in service, and which may be easily and inexpensively manufactured.

The invention, then, comprises the features hereinafter fully described and as particularly pointed out in the claims, the following description and the annexed drawing setting forth in detail certain illustrative embodiments of the invention, these being indicative of some of possibly several ways in which the principles of the invention may be employed.

In said drawing:

FIGURE 1 is a perspective illustrating a device made in accordance with the teachings of the present invention, the same comprising a hollow, generally cylindrical split thimble and a member adapted to cooperate therewith, as will be described more fully hereinafter;

FIGURE 2 is a fragmentary sectional view of the parts illustrated in FIGURE 1;

FIGURE 3 is a perspective of the form of interior part which is illustrated in FIGURES 1 and 2;

FIGURE 4 is a fragmentary sectional view illustrating a modification, the same comprising an interior part or element of changed construction;

FIGURE 5 is a perspective of the interior part of FIGURE 4;

FIGURE 6 is a view, partly in section, illustrating a further embodiment; and

FIGURE 7 is a perspective of that part or element of FIGURE 6 which is adapted to cooperate with the hollow, generally cylindrical thimble.

Referring more particularly to the drawings, the numeral 2 generally designates the main body portion of the device of the present invention, the same comprising a hollow and generally cylindrical shell or thimble 2, the upper portion of which is of dome shape, as shown at 4, and provided with a central aperture 5. The side wall of this shell or thimble 2 is provided with a slot 6 which extends axially throughout its length.

The lower portion of the shell or thimble 2 is transversely cropped as at 7 at a longitudinally oblique angle. The faces of the cropped portions of the side wall of the thimble may, if desired, be reversely curved in the manner indicated in FIGURES 2, 5 and 6. The lowermost portion of the transversely cropped end 7 of the thimble 2 is provided with an aperture 9 to receive one end of the leader, or other fishing device, generally indicated at 10, which may be threaded therethrough and knotted in the manner well known in the art.

According to the teachings of the present invention, the fishing line 12 is adapted to make engagement either directly or indirectly (as will appear hereinafter) with the upper rounded portion 4 of the thimble.

According to the embodiment of FIGURES 1, 2, 3 and 4, the fishing line 12 may extend through the central aperture 5 in the rounded upper end 4 of the thimble 2, and also through an interiorly disposed element (to be later described), the end of said line being knotted to prevent withdrawal.

More specifically, in the embodiment of FIGURES 1, 2 and 3, there is employed a ferrule 14 which comprises a tapered tubular body portion, the outer end of which is beveled as at 15. The lower (and therefore inner) end of the ferrule 14 is provided with an annular flange 16. This flange (16) and the tapered tubular body portion (14) may, if desired, be frusto-conical in shape, the important feature in this instance being that the tapered tubular portion engages the (annular) side wall of the aperture 5 in firm relationship, the remainder of the ferrule being, for the most part, if not entirely, out of contact with the side wall of the thimble.

Referring to FIGURES 4 and 5, there may be employed, in lieu of the ferrule 14, an inverted cup member 20, the side wall or skirt of which is slotted, as at 21, the top being rounded, as at 23, and provided with a central aperture 25. According to this embodiment, the end of the fishing line 12 is knotted on the underside of the inverted cup member 20.

Referring to the embodiment shown in FIGURES 6 and 7, the fishing line 12 is connected to the thimble 2 through an intermediate member generally designated at 30, the same being acceptably formed of stout wire and comprising a main shank with the upper eyelet 32 and a lower portion 34 which is upset to provide two spaced protuberances simulating a dumbbell or hour-glass, the intermediate portion thereof being of reduced diameter, as shown at 35, and, if desired, smoothly concave, as shown. This concave portion 35, which is intermediate the aforementioned spaced protuberances, receives an annular member 36, the periphery of which is rounded and adapted to seat against the side wall of the thimble 2, the latter, in this case, being provided with an annular concave recess 37.

According to all of the embodiments described herein and illustrated in the accompanying drawing, the split thimble 2 and the member with which it is to cooperate (whether it be the ferrule 14, inverted cup member 20, or the member 30) may be formed of various types of materials; for example, non-ferrous metal, plastics such as nylon or Teflon, etc.

It will also be understood by those skilled in the art that, in actual practice, the thimble 2 and its associated member are very small in size, the outside diameter of the thimble being in the nature of three-sixteenths (3/16) inch, or less, the various embodiments being appreciably enlarged in the accompanying drawing for purposes of clarity and understanding.

In connecting the fishing leader to the fishing line pursuant to the teachings of the present invention, the knotted portion of the fishing leader 10, and possibly also the lower end of the thimble 2, may be grasped between the thumb and one of the fingers of the left hand, and the fishing line 12 so held between the thumb and fingers of the right hand that the member carried on its end (whether it be the ferrule 14, inverted cup member 20, or the member 30 of FIGURES 6 and 7 may easily be seated within the thimble and the fishing line and leader so pulled in opposite directions as to enable a firm engagement between the cooperating parts. During such movement, it will be understood that the fishing line 12 is inserted in the thimble 2 sidewise through the longitudinally extending slot 6.

The present application is a continuation of my Patent application Ser. No. 696,172, filed November 13, 1957, entitled "Attaching Means for Fishing Leaders."

While I have shown and described several specific embodiments of the present invention, it will be readily understood by those skilled in the art that I do not wish to be limited exactly thereto, since various modifications may be made without departing from the scope of the invention as defined in the appended claims.

I claim:

1. A coupling device for light fishing tackle and the like, comprising a thin-walled tubular thimble including a fully open cylindrical end and a dome-like end having a central aperture therein; a portion of the side wall of said thin-walled tubular thimble being tapered inwardly toward the fully open end thereof, thereby providing a tail portion; a line connected to the aforementioned tail portion of said thin-walled tubular thimble adjacent its outer extremity; the shortest portion of the side wall of said thin-walled tubular thimble having a slot which extends longitudinally throughout and into communication with the central aperture in said dome-like end; a second line; and a connector element secured to said second line; said connector element including a substantially round base portion of substantially greater diameter than the aforementioned central aperture and adapted to seat in said thin-walled tubular thimble immediately under its dome-like end; the width of the slot in the shortest portion of the side wall of said thin-walled tubular thimble being smaller than the diameter of said central aperture but greater than the diameter of said second line.

2. The combination of claim 1 wherein the connector element carries a tapered extension which is adapted to extend partially through said central aperture.

3. The combination of claim 1 wherein the connector element carries a centrally disposed rod-like member which is adapted to extend through said central aperture.

References Cited in the file of this patent

UNITED STATES PATENTS

| | | |
|---|---|---|
| 561,855 | Baptist | June 9, 1896 |
| 975,067 | Prosser | Nov. 8, 1910 |
| 1,206,584 | Palmer | Nov. 28, 1916 |
| 1,284,972 | Anthony | Nov. 19, 1918 |
| 1,432,117 | Miller | Oct. 17, 1922 |
| 1,453,138 | Holliday | Apr. 24, 1923 |
| 1,614,407 | Stainbrook | Jan. 11, 1927 |
| 1,692,649 | Goodridge et al. | Nov. 20, 1928 |
| 1,771,125 | Kahle | July 22, 1930 |
| 1,895,301 | Vandermark | Jan. 24, 1933 |
| 2,561,144 | Seaton | July 17, 1951 |
| 2,763,089 | McDonald | Sept. 18, 1956 |